United States Patent Office 3,033,679
Patented May 8, 1962

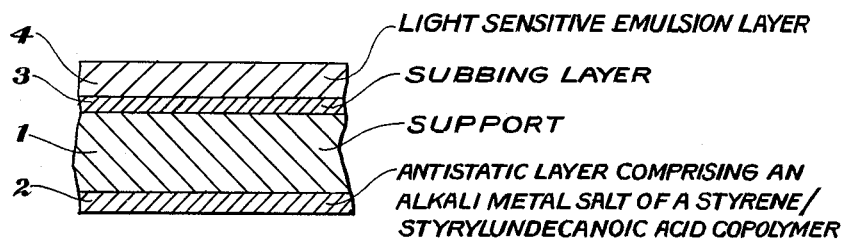
Thomas M. Laakso
Calvin S. Garber
INVENTORS

3,033,679
ANTISTATIC PHOTOGRAPHIC ELEMENT COMPRISING A STYRENE COPOLYMER LAYER
Thomas M. Laakso and Calvin S. Garber, Rochester, N.Y., assignors to Eastman Kodak Company, Rochester, N.Y., a corporation of New Jersey
Filed Oct. 14, 1958, Ser. No. 767,113
7 Claims. (Cl. 96—87)

This invention relates to antistatic photographic film elements prepared with hydrophobic film support materials and having at least one layer thereon which contains a styrene copolymer composition having antistatic properties.

It is known that various hydrophic sheeting materials on handling become charged with static electricity. This property is particularly troublesome in the case of light-sensitive photographic films made from hydrophobic materials such as cellulose derivatives, polyesters, polystyrene, and the like, since the static discharges are recorded in the light-sensitive emulsion layer and are capable of dvelopment to markings that spoil the film. Various polymer compositions have been suggested as antistatic coatings for photographic materials of the above kind based on the compositions having high enough conductivities to prevent and to dissipate any static charge build up. However, while the antistatic compositions proposed heretofore have had some beneficial effects, none have proven entirely satisfactory under practical conditions. Accordingly, an improved antistatic coating composition for eliminating static discharges in photographic film elements has been much desired in the art.

We have now found that certain styrene copolymers on coating aqueous solutions thereof onto hydrophobic film support materials readily dry to hard, insoluble, continuous layers which not only adhere firmly to the surface of the film, but which are relatively good electrical conductors, and further that such hydrophobic sheet materials having a layer of the said styrene copolymer on one surface and a coating of a light-sensitive layer on the other surface, preferably a gelatino-silver halide emulsion layer, can be manufactured, handled, exposed and processed without any static defects resulting from such operations.

It is, accordingly, an object to provide a novel and improved antistatic photographic film element. Another object is to provide a process for preparing the same. Other objects will become apparent hereinafter.

In accordance with the invention, we prepare our new antistatic photographic film elements by coating an aqueous solution of a styrene copolymer consisting of the following recurring structural units:

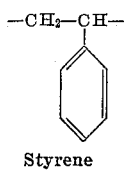

Styrene and

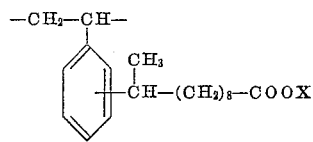

Styrylundecanoic acid salt wherein the said recurring units are in linear combination and wherein X represents an alkali metal atom such as lithium, sodium, potassium, etc., in the proportions of from 1-3 moles of styrene units to from 3-1 moles of the said styrylundecanoic acid salts, i.e. copolymers consisting of from 25-75 mole percent of the former units and from 75-25 mole percent of the latter units on a hydrophobic sheet or film such as a cellulose derivative, e.g., cellulose acetate, cellulose propionate, cellulose acetate butyrate, cellulose nitrate, etc., polystyrene, a polyamide such as nylon, a polyester such as polyethylene terephthalate, polycarbonates, polyethylenes, polypropylenes and the like, drying the coating, then applying to the opposite side or surface of the said film—previously subbed with a conventional subbing composition such as a mixed gelatin-cellulose nitrate, a resinous copolymer such as a terpolymer of vinylidene chloride, an alkyl acrylate and an acid such as itaconic acid, acrylic acid or methacrylic acid, or a combination of such subbing layers, etc.—a light-sensitive material, e.g. a gelatino-silver halide emulsion and drying the resulting antistatic photographic film element. Although the preferred method of employing the said styrene copolymers of the invention is in the form of a backing layer, the copolymer salts can also be incorporated directly in the sensitive emulsion layer or used in the form of an overcoating layer over the sensitive emulsion layer to give antistatic properties to the photographic film element. Advantageously, a lower aliphatic alcohol such as methanol, ethanol or n-propanol may be employed in admixture with water to form suitable coating compositions of the styrene copolymers. Preferably the concentration of the said copolymer can vary from 0.05 to 2.0% or more but the best results are obtained with concentrations of from 0.25-1.0%. An especially efficacious antistatic composition comprises from 0.25-1.0% by weight of the potassium salt of a 1:1 styrene/styrylundecanoate in a solvent combination of from 35-50% by weight of water and 65-50% by weight of methanol.

The styrene copolymers employed as antistatic compositions in the invention may be prepared by polymerizing styrene and styrylundecanoic acid or alkali metal salt thereof in the specified proportions in the presence of a polymerization catalyst. Heat and actinic light such as ultraviolet light accelerate the polymerizations. Where the free acid is polymerized, the copolymer product may be converted to the alkali metal salt by treatment with an alkali metal hydroxide, such as for example potassium hydroxide. The polymerizations may be carried out in mass in solution or in dispersed form in a nonsolvent such as water. Suitable polymerization catalysts include catalysts, e.g. benzoyl peroxide, acetyl peroxide, lauroyl peroxide, hydrogen peroxide, etc., persulfates, e.g. sodium or potassium persulfate and ammonium persulfate, perborates, e.g. sodium and potassium perborates, etc. Other suitable catalysts include bis-azoisobutyronitrile, boron trifluoride, ketazines, azines, etc. Mixtures of catalysts may also be employed. The amount of catalyst can range from about 0.01-2.0% or more, based on the total weight of the monomers. The temperature for carrying out the polymerizations can vary from 30°-120° C. but preferably from about 50-100° C. If desired, the polymerizations may also be carried out above atmospheric pressures. As previously indicated, the proportions of the components in the copolymer can vary in the rate of from 1-3 moles of the styrene component to from 3-1 moles of the styrylundecanoic acid or salt component. Amounts less than 25 mole percent of the latter component do not give satisfactory antistatic coatings, while amounts above 75 mole percent result in relatively softer antistatic coatings which have certain limited uses. Further details for the preparation of the intermediate styrylundecanoic acids, copolymers thereof with styrene and alkali metal salts of the same, can be had by reference to S. K. Sinha and A. I. Medalia, J. Am. Chem. Soc., 79, pages 281-87 (1957), and by reference to H. H. Friedman et al., J. Org. Chem., 23, pages 76-82 (1958).

The accompanying drawing is a sectional view of a photographic film element comprising a hydrophobic film support, made of materials such as previously mentioned, which has coated thereon a layer 2 comprising an alkali metal salt of a copolymer of styrene and a nuclear substituted styrylundecanoic acid, and on the opposite side a conventional subbing layer 3 and over this a layer 4 comprising a light-sensitive material, e.g. a gelatino-silver halide emulsion layer. The layer 2 may also have therein a substantial proportion of gelatin if desired. Although the preferred method of the invention is to employ the said copolymer salts in the form of a backing layer as shown in the drawing, the copolymer salts as previously mentioned, may also be incorporated directly in the sensitive emulsion layer or used as an overcoating layer over the sensitive layer to give antistatic properties to the resulting photographic film element.

The following examples will serve to illustrate further the preparation of the antistatic photographic film elements of the invention.

*Examples 1 and 2*

A 1% coating solution of the potassium salt of 1:1 styrene/p-styrylundecanoate copolymer was prepared by dissolving 70 g. of a 10% aqueous stock solution in 245 cc. of water and diluting to a total volume of 700 cc. with methanol. Then 350 cc. of this solution was applied by a coating machine as a thin layer to the back surface of a cellulose acetate film base. Dilutions of the remaining 1% solution were made with a solvent combination consisting of 35 parts of water and 65 parts of methanol to prepare 0.5% and 0.25% concentrations. These solutions were similarly coated.

After drying and curing, the coated films were further coated on the reverse side with a suitable subbing layer and an ordinary black and white gelatino-silver halide emulsion applied thereover and dried. These photographic elements were then tested for surface resistivity which is an effective means of evaluating antistatic behavior. A tackiness test was also carried out. Camera tests were also made. On development, none of the coated films showed any static markings. The results obtained are shown in the following tabulation:

| Example | Concentration of coating solution | Surface resistivity $\times 10^{10}$ | Tackiness |
| --- | --- | --- | --- |
| 1 | 1.0 | 0.027 | 20 |
| 2 | 0.5 | 0.012 | 15 |
| 3 | 0.25 | 0.015 | Slight |

Since resistivities of $1 \times 10^{10}$ ohms or less have been found to alleviate difficulties from static electricity generated in the normal handling of photographic film, it will be seen from the above results that by use of the said styrene copolymer salts of the invention in appropriate concentrations and solvent combinations as coatings, films were prepared which were entirely free of troublesome static effects. Concerning the evaluation of tackiness, a value of 50 or less is considered satisfactory for this test. It will be seen that the above results in this respect were entirely satisfactory. The test for tackiness is really a measure of relative adhesion wherein a roll of film is simulated, i.e. the coated surface is pressed tightly against a similar but uncoated film of cellulose acetate, and the tension required to strip the film layers apart is taken as the measure of tackiness. For measuring the conductivities, this was carried out by placing two parallel electrodes on the film at a fixed relative humidity of 50%; these electrodes are long compared to the distance between them so as to avoid end effects. The observed reading is divided by the distance between the electrodes and multiplied by their length to obtain surface resitivity in ohms, the conductivity being the reciprocal thereof.

In place of the potassium salt of the 1:1 styrene/p-styrylundecanoate copolymer, there may be substituted in the above examples like amounts of the corresponding lithium and sodium salt to give generally similar antistatic photographic film elements. Also, the alkali metal salts of the copolymers of styrene and o-styrylundecanoic and m-styrylundecanoic acids can be substituted. Instead of the 1:1 copolymers, there may likewise be substituted in the above examples any other of the copolymers coming within the specified molar proportions of components to give generally similar antistatic photographic film elements.

While the preceding description and examples have indicated that the specified copolymers of the invention are outstanding for use as antistatic materials, it will be understood that for some applications, copolymers containing more than 75 mole percent of the styrylundecanoate component can be employed, for example, 80, 90, or even 100 mole percent (styrylundecanoate homopolymer), alone or in admixture with the preferred copolymer compositions.

The invention has been described in detail with particular reference to preferred embodiments thereof, but it will be understood that variations and modifications can be effected within the spirit and scope of the invention described hereinabove and as defined by the appended claims.

What we claim is:

1. An antistatic photographic film element comprising a hydrophobic film support having thereon at least one sensitive silver halide emulsion layer and having in at least one outer stratum thereof a copolymer of from 25–75 mole percent of styrene and 75–25 mole percent of a compound represented by the following general formula:

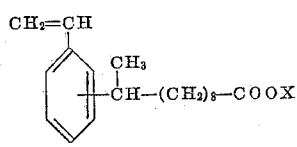

wherein X represents an alkali metal atom.

2. An antistatic photographic film element comprising a cellulose ester film support having on one side thereof at least one sensitive silver halide emulsion layer and on the opposite side thereof a layer comprising a copolymer of from 25–75 mole percent of styrene and from 75–25 mole percent of the potassium salt of p-styrylundecanoic acid.

3. An antistatic photographic film element comprising a cellulose acetate film support having on one side thereof at least one sensitive silver halide emulsion layer and on the opposite side thereof a layer comprising a copolymer of from 25–75 mole percent of styrene and from 75–25 mole percent of the potassium salt of p-styrylundecanoic acid.

4. An antistatic photographic film element comprising a cellulose acetate film suport having on one side thereof at least one sensitive silver halide emulsion layer and on the opposite side thereof a layer comprising a copolymer of 50 mole percent of styrene and 50 mole percent of the potassium salt of p-styrylundecanoic acid.

5. An antistatic photographic film element comprising a cellulose acetate film support having on one side a gelatino-silver halide emulsion layer and on the opposite side thereof a layer comprising a copolymer of 50 mole percent of styrene and 50 mole percent of the potassium salt of p-styrylundecanoic acid.

6. An antistatic photographic film element comprising a cellulose acetate film support having on at least one side thereof a sensitive silver halide emulsion layer and having over at least one of said sensitive silver halide emulsion layers a layer comprising a copolymer of 50 mole percent of styrene and 50 mole percent of the potassium salt of p-styrylundecanoic acid.

7. An antistatic photographic film element comprising a cellulose acetate film support having on one side thereof a gelatino-silver halide emulsion layer and over the said emulsion layer an overcoating layer comprising a copolymer of 50 mole percent of styrene and 50 mole percent of the potassium salt of p-styrylundecanoic acid.

References Cited in the file of this patent

UNITED STATES PATENTS

| | | |
|---|---|---|
| 2,074,647 | Hagedorn | Mar. 23, 1937 |
| 2,717,834 | Saner | Sept. 13, 1955 |

OTHER REFERENCES

Medalia: J.O.A.C.S., 79, pages 281–87 (1957).